(12) United States Patent
Chen et al.

(10) Patent No.: US 8,838,127 B2
(45) Date of Patent: Sep. 16, 2014

(54) INTERFERENCE MITIGATION METHOD IN CELLULAR WIRELESS NETWORK, AND APPARATUS WITH THE SAME

(71) Applicant: Industrial Technology Research Institute, Hsinchu (TW)

(72) Inventors: Ren-Jr Chen, Hsinchu (TW); Tzu-Jane Tsai, Hsinchu County (TW); Sung-En Chiu, Hsinchu County (TW); Kuan-Hung Chou, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/721,020

(22) Filed: Dec. 20, 2012

(65) Prior Publication Data

US 2013/0303177 A1    Nov. 14, 2013

Related U.S. Application Data

(60) Provisional application No. 61/645,638, filed on May 11, 2012, provisional application No. 61/654,970, filed on Jun. 4, 2012.

(51) Int. Cl.

| | | |
|---|---|---|
| *H04W 72/00* | (2009.01) | |
| *H04W 72/08* | (2009.01) | |
| *H04B 15/00* | (2006.01) | |
| *H04B 1/10* | (2006.01) | |
| *H04W 4/00* | (2009.01) | |
| *H04J 3/00* | (2006.01) | |
| *H04L 1/18* | (2006.01) | |

(52) U.S. Cl.
CPC ............. *H04W 72/082* (2013.01); *H04B 15/00* (2013.01); *H04W 72/00* (2013.01)
USPC ........ 455/450; 455/452.1; 455/296; 714/748; 370/329; 370/280

(58) Field of Classification Search
USPC .......................................... 455/450
See application file for complete search history.

(56) References Cited

U.S. PATENT DOCUMENTS

| | | |
|---|---|---|
| 8,160,629 B2 | 4/2012 | Mate et al. |
| 2008/0062925 A1 | 3/2008 | Mate et al. |
| 2009/0137221 A1* | 5/2009 | Nanda et al. .................. 455/296 |
| 2009/0197631 A1 | 8/2009 | Palanki et al. |
| 2009/0249153 A1* | 10/2009 | Zhang .......................... 714/748 |
| 2011/0235582 A1 | 9/2011 | Chen et al. |
| 2013/0059593 A1* | 3/2013 | Hu et al. .................... 455/452.1 |

FOREIGN PATENT DOCUMENTS

| | | | |
|---|---|---|---|
| EP | 2706690 A2 | * | 5/2012 |
| WO | WO2011130438 A1 | * | 4/2011 |
| WO | WO 2012/156574 A1 | * | 3/2012 |

OTHER PUBLICATIONS

3GPP TSG RAN WG1 Meeting #68bis Jeju, Korea, Mar. 26-30, 2012—R1-121461.*

(Continued)

*Primary Examiner* — Timothy Pham
(74) *Attorney, Agent, or Firm* — Jianq Chyun IP Office

(57) ABSTRACT

Interference mitigation methods in a small cell wireless network are provided. In the methods, negotiations between different stations are provided for interference mitigation. By such negotiations, UL-DL configurations are chosen in considering interference between neighboring stations and the interferences therefrom are effectively mitigated.

32 Claims, 15 Drawing Sheets

(56) References Cited

OTHER PUBLICATIONS

Li et al., "A Downlink ICIC Method Based on Priority in LTE-Advanced Systems," 2011 4th IEEE International Conference on Broadband Network and Multimedia Technology (IC-BNMT), Oct. 28-30, 2011, pp. 498-501.

Han et al., "A Novel Inter-cell Interference Coordination Scheme based on Dynamic Resource Allocation in LTE-TDD Systems," 2010 IEEE 71st Vehicular Technology Conference (VTC 2010—Spring), May 16-19, 2010, pp. 1-5.

Okino et al, "Pico Cell Range Expansion with Interference Mitigation toward LTE-Advanced Heterogeneous Networks," 2011 IEEE International Conference on Communications Workshops (ICC), Jun. 5-9, 2011, pp. 1-5.

Fraimis et al., "A Decentralized Subchannel Allocation Scheme with Inter-cell Interference Coordination (ICIC) for Multi-Cell OFDMA Systems," 2010 IEEE Global Telecommunications Conference (GLOBECOM 2010), Dec. 6-10, 2010, pp. 1-5.

Chen et al., "Technical Innovations Promoting Standard Evolution: From TD-SCDMA to TD-LTE and Beyond," IEEE Wireless Communications 19(1), Feb. 2012, pp. 60-66.

Feki et al., "Autonomous Resource Allocation for dense LTE networks: A Multi Armed Bandit formulation," 2011 IEEE 22nd International Symposium on Personal Indoor and Mobile Radio Communications (PIMRC), Sep. 11-14, 2011, pp. 66-70.

\* cited by examiner

| Pico station | UL-DL Configuration | DL-to-UL Switch-point periodicity | Subframe Number ||||||||||
|---|---|---|---|---|---|---|---|---|---|---|---|---|
| | | | 0 | 1 | 2 | 3 | 4 | 5 | 6 | 7 | 8 | 9 |
| 110 | 0 | 5 ms | D | S | U | U | U | D | S | U | U | U |
| 140 | 1 | 5 ms | D | S | U | U | D | D | S | U | U | D |
| | 2 | 5 ms | D | S | U | D | D | D | S | U | D | D |
| 120 | 3 | 10 ms | D | S | U | U | U | D | D | D | D | D |
| | 4 | 10 ms | D | S | U | U | D | D | D | D | D | D |
| 150 | 5 | 10 ms | D | S | U | D | D | D | D | D | D | D |
| 130 | 6 | 5 ms | D | S | U | U | U | D | S | U | U | D |

FIG. 1B (RELATED ART)

$PicoA: QD^1_{UL} = 86, QD^1_{UL} = 106$ $PicoB: QD^2_{UL} = 123, QD^2_{UL} = 206$ $R\frac{UL}{DL} = \frac{\sum_{i=0}^{n} QD^i_{UL}}{\sum_{i=0}^{n} QD^i_{DL}} = \frac{86+123}{106+206} = 0.67$

| UL–DL Configuration | Subframe Number | | | | | | | | | | UL/DL |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 1.62 |
| 1 | D | S | U | U | D | D | S | U | U | D | 0.70 |
| 2 | D | S | U | D | D | D | S | U | D | D | 0.26 |
| 3 | D | S | U | U | U | D | D | D | D | D | 0.44 |
| 4 | D | S | U | U | D | D | D | D | D | D | 0.25 |
| 5 | D | S | U | D | D | D | D | D | D | D | 0.11 |
| 6 | D | S | U | U | U | D | S | U | U | D | 1.06 |

INTERFERENCE MITIGATION METHOD IN CELLULAR WIRELESS NETWORK, AND APPARATUS WITH THE SAME

CROSS-REFERENCE TO RELATED APPLICATION

This application claims the priority benefits of U.S. provisional application Ser. No. 61/654,970, filed on Jun. 4, 2012, and U.S. provisional application Ser. No. 61/645,638, filed on May 11, 2012. The entirety of each of the above-mentioned patent applications is hereby incorporated by reference herein and made a part of this specification.

TECHNICAL FIELD

The technical field relates to an interference mitigation method in a cellular wireless network.

BACKGROUND

In a cellular wireless network (for example a small cell wireless network), downlink (DL) interference has an impact on the uplink (UL) SINR (Signal-to-Interference-Noise-Ratio) of the user equipment (UE) if the station randomly chooses transmission directions. The impact is more significant between UP-DL (uplink-downlink) communications between the stations and the UEs in a small wireless network.

Taking the LTE TDD for example, one of the advantages of using LTE TDD is that it is possible to dynamically change the uplink and downlink balance and characteristics to meet the load conditions. In order that this can be achieved in an ordered fashion, a number of standard configurations have been set within the LTE standards.

In LTE TDD subframe allocation, a total of seven UP-DL (uplink-downlink) configurations have been set, and these use either 5 ms (microsecond) or 10 ms switch-point periodicities. In the case of the 5 ms switch-point periodicity, a special subframe exists in both half frames. In the case of the 10 ms switch-point periodicity, the special subframe exists in the first half frame only.

Please refer to FIG. 1A and FIG. 1B. In FIG. 1A, a Pico station chooses a UL-DL configuration according to its UL-DL traffic conditions based on the table shown in FIG. 1B. FIG. 1B shows the seven configurations of 3GPP Long Term Evolution (LTE) TDD UL-DL configurations. Different Pico stations 110~150 have chosen their respective UL-DL configurations, for example, the Pico Stations 110, 120, 130, 140, 150 respectively chooses UL-DL configurations 0, 3, 6, 1 and 5. The information for every configuration is respectively shown in FIG. 1B, in which DL-to-UL switch-point periodicities are 5 ms or 10 ms, and subframes 0~9 are configured as shown in the table of FIG. 1B. In the table, "D" is a subframe for downlink transmission, "S" is a special subframe used for a guard time, and "U" is a subframe for uplink transmission.

When the Pico station 120 with Configuration 3 has DL transmission in the subframes 7 and 8, it may cause a severe interference to the neighbor Pico station 110 with Configuration 0 to receive an UL signal in the subframes 7 and 8. It is observed that an UL SINR of the UE is suffered severer DL interference from the neighbor Pico stations, if both they are active in transmission and choose different configurations.

SUMMARY

One of exemplary embodiments comprises an interference mitigation method for a plurality of stations in a wireless network. The plurality of stations uses a plurality of uplink-downlink (UL-DL) configurations in transmission. In the method, neighbor stations of a first station from a plurality of stations are determined by criteria. The first station negotiates with at least a portion of the neighbor stations to determine the UL-DL configurations for transmission when the first station is active in transmission, otherwise, the neighbor stations flexibly determining one of the UL-DL configurations for transmission.

One of exemplary embodiments comprises a station including a transceiver and a processor. The transceiver is configured to transmit and receive wireless signals with a plurality of stations in a wireless network. The plurality of stations uses a plurality of uplink-downlink (UL-DL) configurations in transmission, and the station has a plurality of neighbor stations determined by criteria. The processor is coupled to the transceiver and is configured to negotiate with at least a portion of the neighbor stations to determine the UL-DL configurations of the pico station and the portion of the neighbor stations when the station is active in transmission, otherwise, the neighbor stations flexibly determining one of the UL-DL configurations for transmission.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1B is a schematic diagram illustrating seven configurations of 3GPP Long Term Evolution (LTE) TDD UL-DL configurations.

DETAILED DESCRIPTION OF DISCLOSED EMBODIMENTS

Figure 1A:
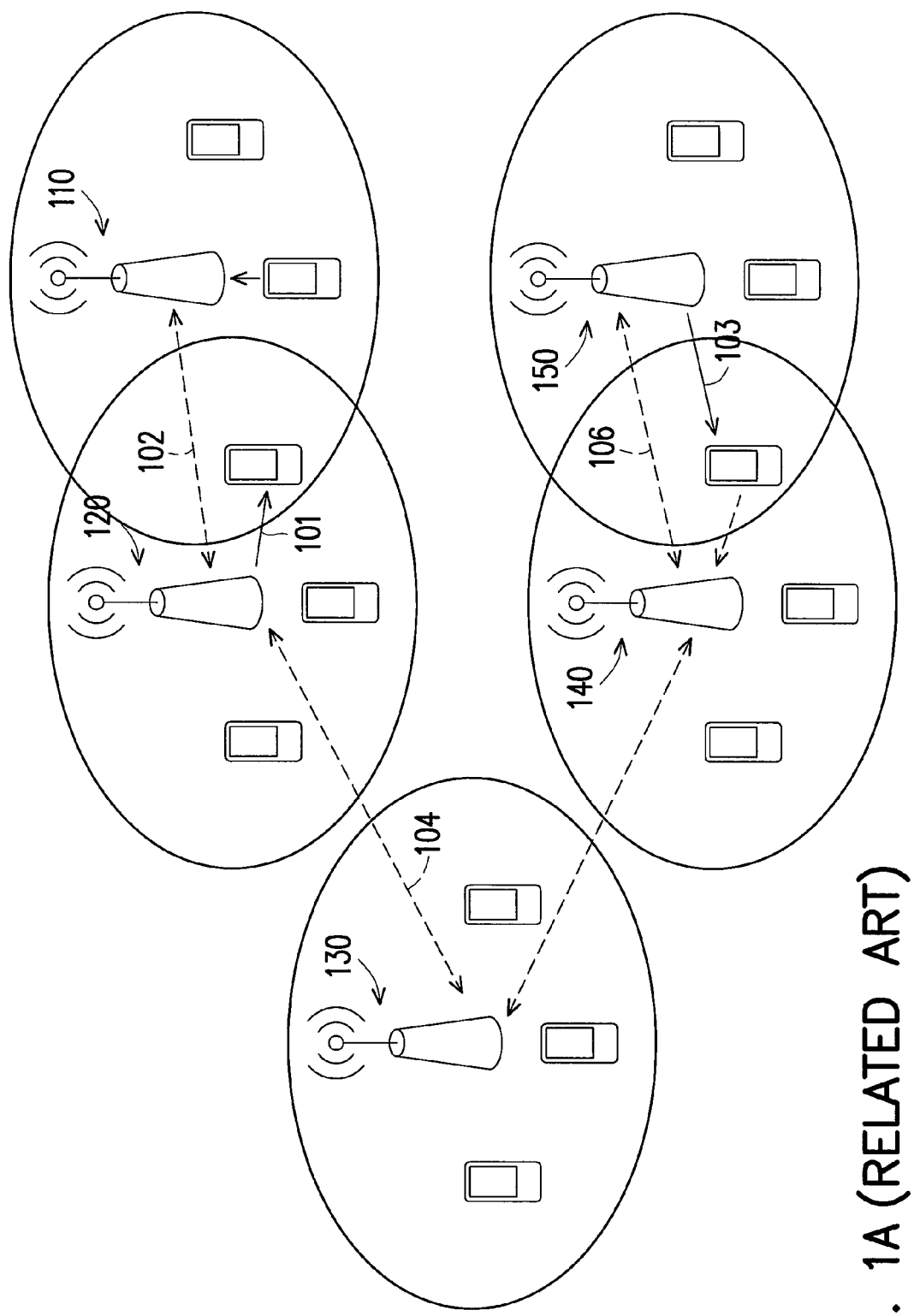
FIG. 1A is a schematic diagram illustrating a Pico station chooses a UL-DL configuration according to its UL-DL traffic conditions.

The disclosure herein provides methods of some exemplary embodiments for interference mitigation in a small cell wireless network. The small cell wireless network herein may be referred to a wireless network, which there are common cells and small cells (such as femtocells, picocells, and microcells). The small cell wireless network may cover both homo and hetero network where the operation may be in a network includes, but not limited to, small cells only (picocells or femtocells or others), small cells and macro cells, or macrocells only. The methods of some exemplary embodiments for interference mitigation may apply on any of the nodes, and the neighbor nodes could also be any type of node.

The methods for interference mitigation may apply on any type of cellular network nodes. Hereinafter, pico stations of the small cells in the small cell wireless network are introduced for one of some exemplary embodiments, but not limited thereto. The exemplary method for interference mitigation may be implemented among the pico stations, or may be implemented among the other small cell stations, or among in an environment which the small cell stations and common cell stations exist.

The disclosure herein provides methods of some exemplary embodiments for interference mitigation in a small cell wireless network. In the methods, negotiations between different Pico stations are provided for interference mitigation. By such negotiations, UL-DL configurations are chosen in considering interference between neighboring Pico stations and the interferences therefrom are effectively mitigated.

One of the nodes or the stations of the cellular network may include a transceiver and a processor. The transceiver is configured to transmit and receive wireless signals with a plurality of stations in a wireless network. The plurality of stations uses a plurality of uplink-downlink (UL-DL) configurations in transmission, and the pico station has a plurality of neighbor stations determined by criteria. The processor is coupled to the transceiver and configured to negotiate with at least a portion of the neighbor stations to determine the UL-DL configurations of the pico station and the portion of the neighbor stations when the pico station is active in transmission, otherwise, the neighbor stations flexibly determines one of the UL-DL configurations for transmission.

One of exemplary embodiments of the disclosure is a dynamic negotiation interference mitigation method ("DNIM"). In DNIM, an active Pico station negotiates with the neighbor Pico stations and the neighbors of the neighbor Pico stations that are active in transmission to choose a suitable UL-DL configuration according to their collective traffic conditions. The neighbor Pico stations have low pathloss, large-scale fading, or other fading to the Pico station, so there are strong interferences between the Pico station and the neighbor Pico stations if they choose different UL-DL configurations in transmission at the same time. Alternatively, an operator who is a provider for the network services may be assigned in the small cell wireless network to determine which stations are neighbor, where the criteria could be chosen by the operator itself. Furthermore, some small or common cell stations may not join the negotiation because of functional or other reasons. Note that the neighbor Pico stations may send negotiation messages to their neighbors and the Pico stations received the negotiation messages collectively choose a suitable UL-DL configuration. The negotiation maintains the traffic adaption gain from TDD UL-DL reconfiguration.

One of exemplary embodiments of the disclosure is static negotiation interference mitigation method ("SNIM"). In SNIM, Pico stations are divided into groups according to pathloss, large-scale fading, or other fading, so the Pico-Pico links between a Pico station and its neighbor Pico stations in a group have strong interference. Alternatively, an operator may be assigned to determine which stations are neighbor, where the criteria could be chosen by the operator itself. Furthermore, some small or common cell stations may not join the negotiation because of functional or other reasons. If the Pico stations having many neighbor Pico stations in the same group are active in transmission, all of the Pico stations in the group will choose the same UL-DL configuration according to their collective traffic conditions. If the Pico stations having many neighbor Pico stations in the same group are inactive, the other Pico stations in the group may flexibly choose UL-DL configurations according to their respective traffic conditions for possibly achieving a better traffic adaption gain. That is a static negotiation method for interference mitigation in the wireless network.

Some of exemplary embodiments of the disclosure are provided to diminish the DL-UL interferences during the second half of one frame in negotiation interference mitigation methods. One of them is to divide Pico stations into groups according to pathloss, large-scale fading, or other fading. Alternatively, an operator may be assigned in the small cell wireless network to determine which stations are neighbor, where the criteria could be chosen by the operator itself. Furthermore, some small or common cell stations may not join the negotiation because of functional or other reasons. Then the configurations with the same switch-point period are operated within the Pico stations of a group. Another one of them is that a Pico station chooses the configuration according to its traffic condition, and if a Pico station chooses a 5 ms switch-point periodicity configuration, the Pico station has to negotiate with neighbor Pico stations with 10 ms period to request reducing DL transmission power in some subframes during the second half of one frame if the DL-UL interferences occur.

Therefore, there are several factors considered here in these embodiments. For example, in one embodiment, according to the switch-point periodicity, the configurations are divided into different classes. Configurations in the same class are operated within the Pico stations of the group. In another embodiment, Pico stations which are identified as interfering Pico stations reduce DL transmission power in some subframes during the second half of one frame. The aforesaid embodiments may be combined to work in a group structure, or work in a normal structure, but not limit to these combinations.

Therefore, in these methods of some exemplary embodiments for interference mitigation in the wireless network, active Pico station negotiates with the neighbor Pico stations and the neighbors of the neighbor Pico stations that are active in transmission to choose a suitable UL-DL configuration according to their collective traffic conditions. In one embodiment with grouping, if the Pico stations having many neighbor Pico stations in a group are active in transmission, all Pico stations in the same group choose the same UL-DL configuration according to their collective traffic conditions for possibly reducing interferences between the Pico station and the neighbor Pico stations. In other embodiment with grouping, if the Pico stations having many neighbor Pico stations in a group are inactive, the other Pico stations in the group flexibly choose UL-DL configurations according to their respective traffic conditions for possibly achieving a better traffic adaption gain.

In the disclosure, these methods of some exemplary embodiments for interference mitigation in the wireless network mitigate the negative impact of DL interference on UL transmissions. The techniques described herein may be used for various wireless communication networks such as TD-SCDMA, WiMax TDD, LTE TDD and other networks. Certain aspects of the techniques are described below for LTE as an example, but not limited thereto.

Please refer to FIGS. 2A~2D, which schematically illustrate some exemplary embodiments of the dynamic negotiation interference mitigation method ("DNIM").

Figure 2A:
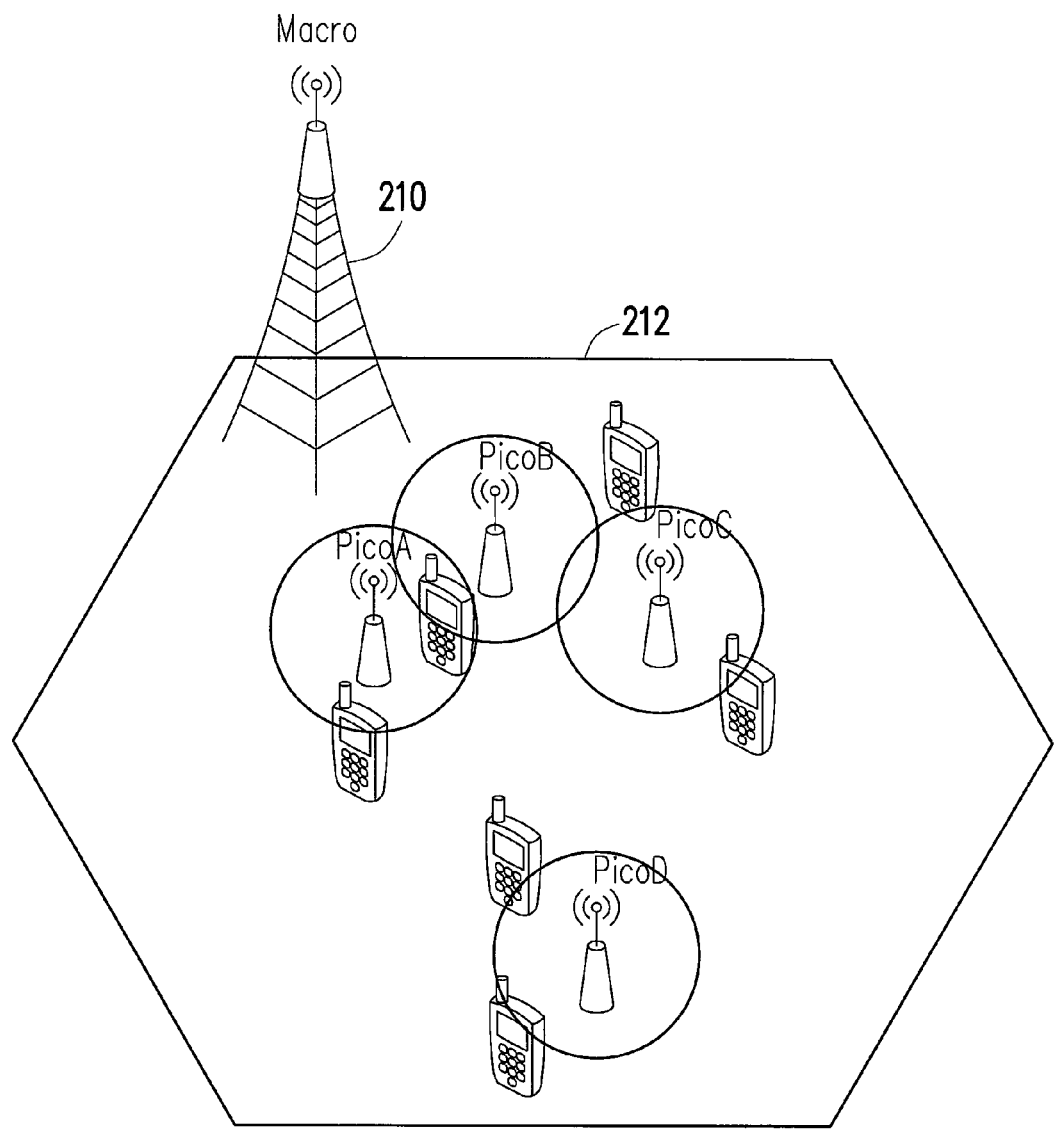
FIG. 2A is a schematic diagram illustrating a dynamic negotiation interference mitigation method ("DNIM") of one of exemplary embodiments of the disclosure.

As in FIG. 2A, in a small cell wireless network, a macro station may provide communication coverage for Pico stations, Femto cells, and/or other types of cells or stations. The macro station may cover a relatively large geographic area (e.g., several kilometers in radius) and may allow unrestricted access by UEs with service subscription. The pico station may cover a relatively small geographic area and may allow unrestricted access by UEs with service subscription. In the exemplary embodiment, in the communication coverage 212 of a macro station 210, there are four Pico stations PicoA, PicoB, PicoC and PicoD, for example. In the communication coverage of each of the Pico stations, there are several UEs communicating thereto for service subscription.

Figure 2B:
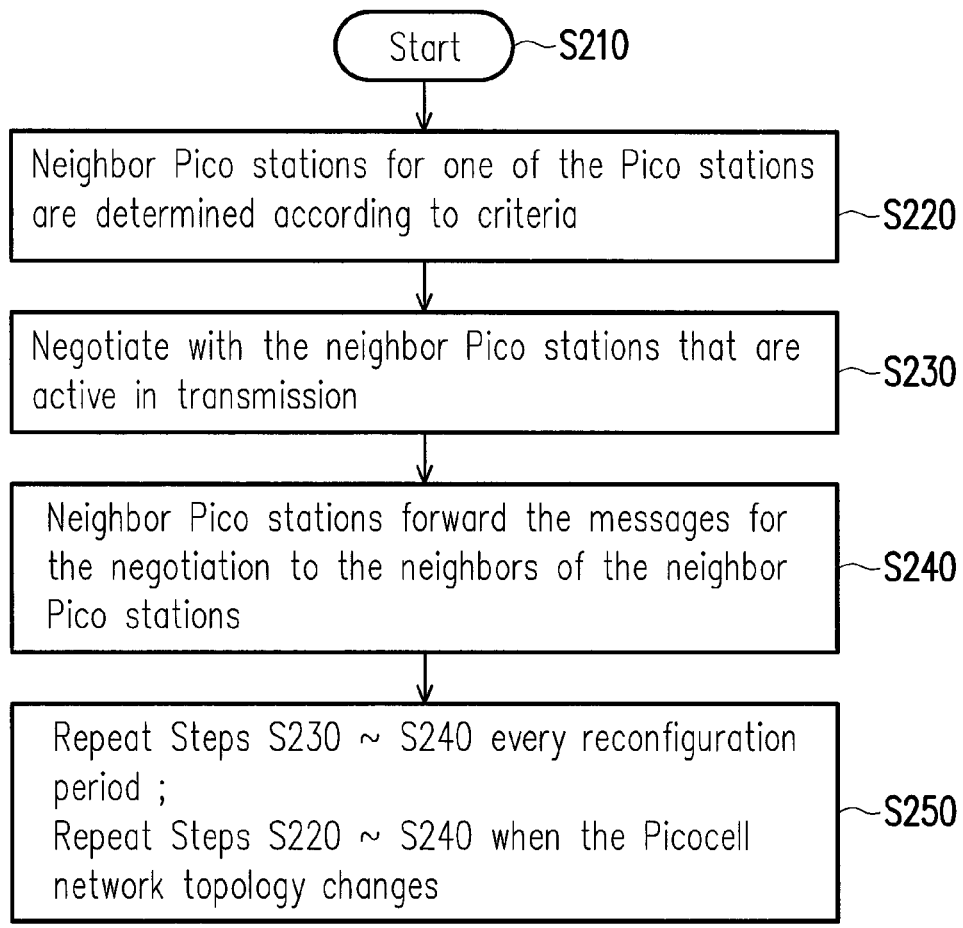
FIG. 2B is a schematic diagram illustrating a flow chart according to one of the embodiments for the DNIM method.

The exemplary embodiment of the DNIM method is illustrated according to FIG. 2A and FIG. 2B. FIG. 2B shows a flow chart of one of the embodiments to schematically illustrate the DNIM method. In step S210, when the DNIM method is started. In step S220, neighbor Pico stations for one of the Pico stations are found according to criteria. In the criteria, at least one factors including pathloss, large-scale fading, or other fading are considered, so the Pico-Pico links between the Pico station and its neighbor Pico stations have strong interference. Alternatively, an operator may determine which stations are neighbor, where the criteria could be chosen by the operator itself. Furthermore, some small or common cell stations may not join the negotiation because of functional or other reasons. It is observed that the Pico station PicoB's neighbor Pico stations PicoA and PicoC have low pathloss, large-scale fading, or other fading to the Pico station PicoB, as in step S220. In step S230, if the Pico station PicoB wants to be active in transmission, it negotiates with the neighbor Pico stations that are active in transmission, for example, Pico Station PicoA and/or PicoC. In step S240, the neighbor Pico stations may send messages for the negotiation to the neighbors of the neighbor Pico stations and the Pico stations received the messages negotiate to choose a suitable UL-DL configuration according to their traffic collective conditions. In step S250, the steps S230~S240 are repeated every reconfiguration period, and steps S220~S240 are repeated when the Picocell network topology changes. In one of the embodiments, in steps S230 and S240, the Pico stations may find a moderator Pico station to centrally negotiate for possibly reducing the number of sending.

If Pico stations PicoA, PicoB and PicoC are active; they will negotiate with each other and choose a suitable UL-DL configuration according to their collective traffic conditions. Pico station PicoB may be a moderator Pico to centrally negotiate for possibly reducing the number of sending even if it is inactive. If only Pico stations PicoA and PicoC are active, they will choose respective UL-DL configurations according to their respective traffic conditions.

Figure 2C:
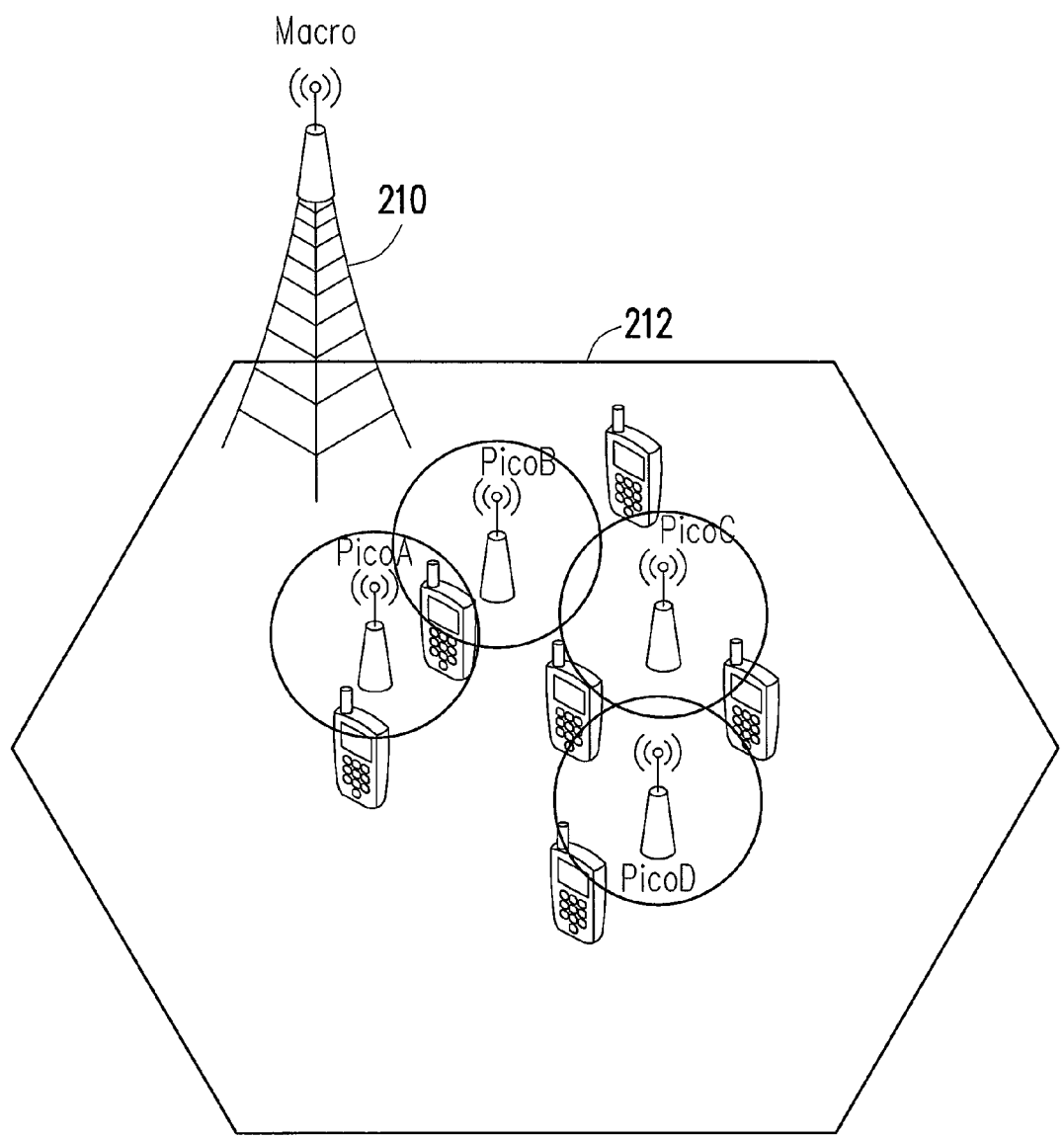
FIG. 2C is a schematic diagram illustrating Pico stations choose a UL-DL configuration according to its UL-DL traffic conditions according to one of the embodiments for the DNIM method.

Please refer to FIG. 2C, there are four Pico stations, including PicoA, PicoB, PicoC, and PicoD. There are strong DL-UL interferences between Pico stations PicoA and Pico B, between Pico stations PicoC and PicoB, and between Pico stations PicoC and PicoD but there is not strong DL-UL interference between Pico stations PicoA and PicoC, or PicoA and PicoD. The Pico stations PicoA, PicoB, PicoC and PicoD are arranged to be in the same group for negotiation interference mitigation. As stated in step S240 of FIG. 2B, if Pico station PicoB is a moderator Pico to centrally negotiate for possibly reducing the number of sending even if it is inactive, the neighbor Pico station PicoC may send messages for the negotiation to the neighbouring Pico station PicoD, and the Pico station PicoD received the messages negotiate to choose a suitable UL-DL configuration according to their collective traffic conditions.

Figure 3A:
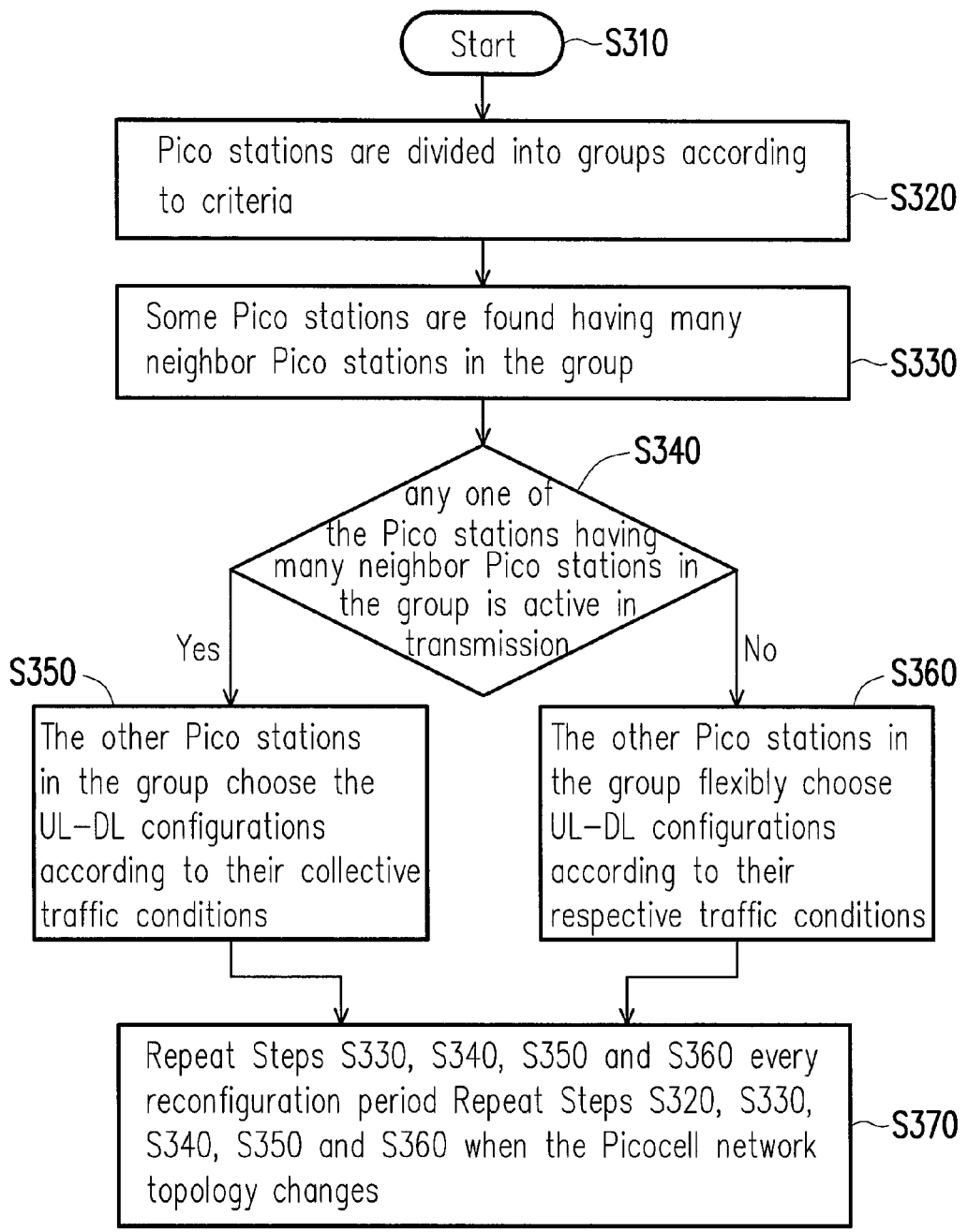
FIG. 3A is a schematic diagram illustrating a flow chart according to one of the embodiments of a static negotiation interference mitigation method ("SNIM").
Figure 3B:
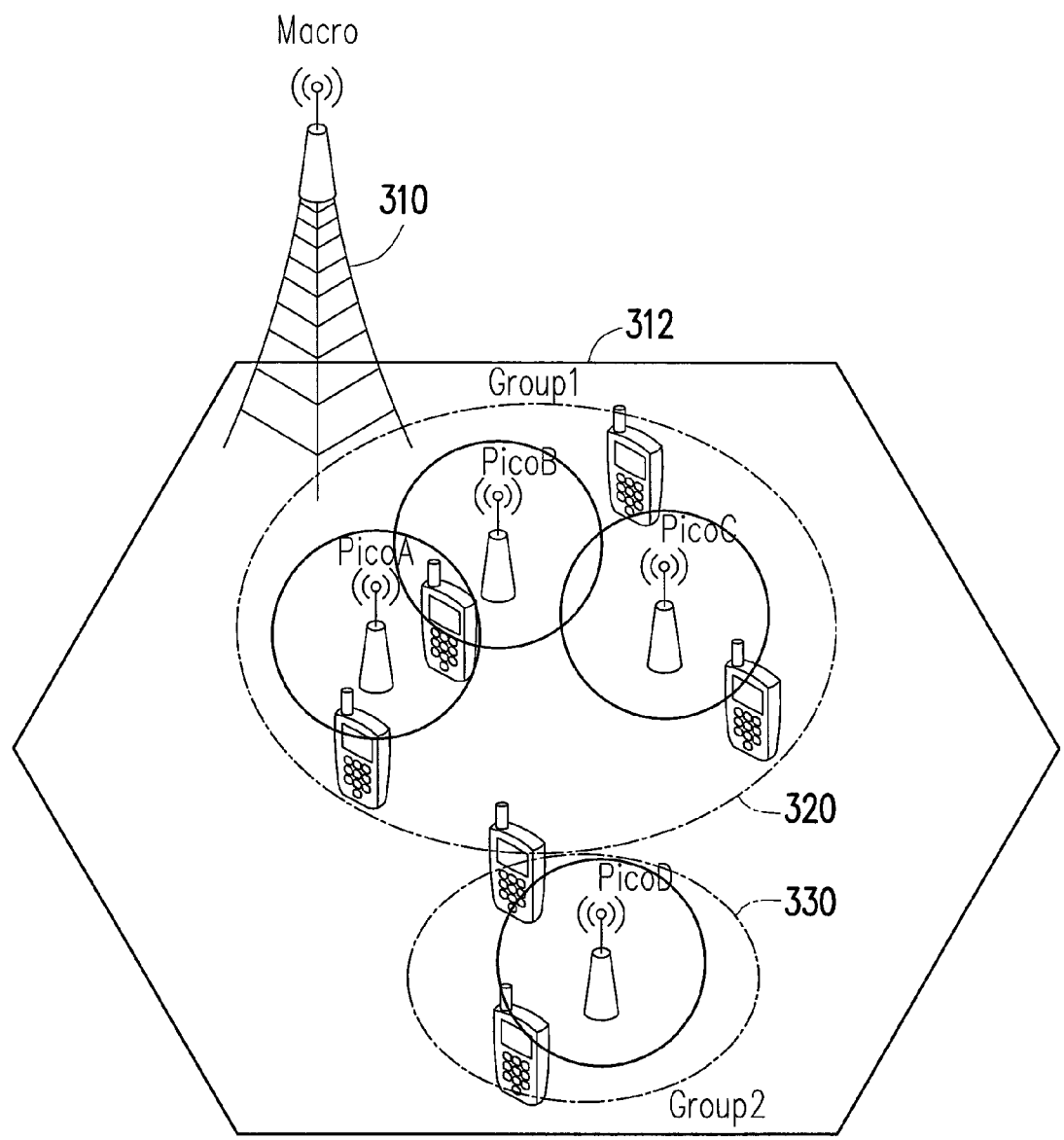
FIGS. 3B and 3C are schematic diagrams respectively illustrating that Pico stations choose a UL-DL configuration according to its UL-DL traffic conditions according to one of the embodiments for the SNIM method.
Figure 3C:
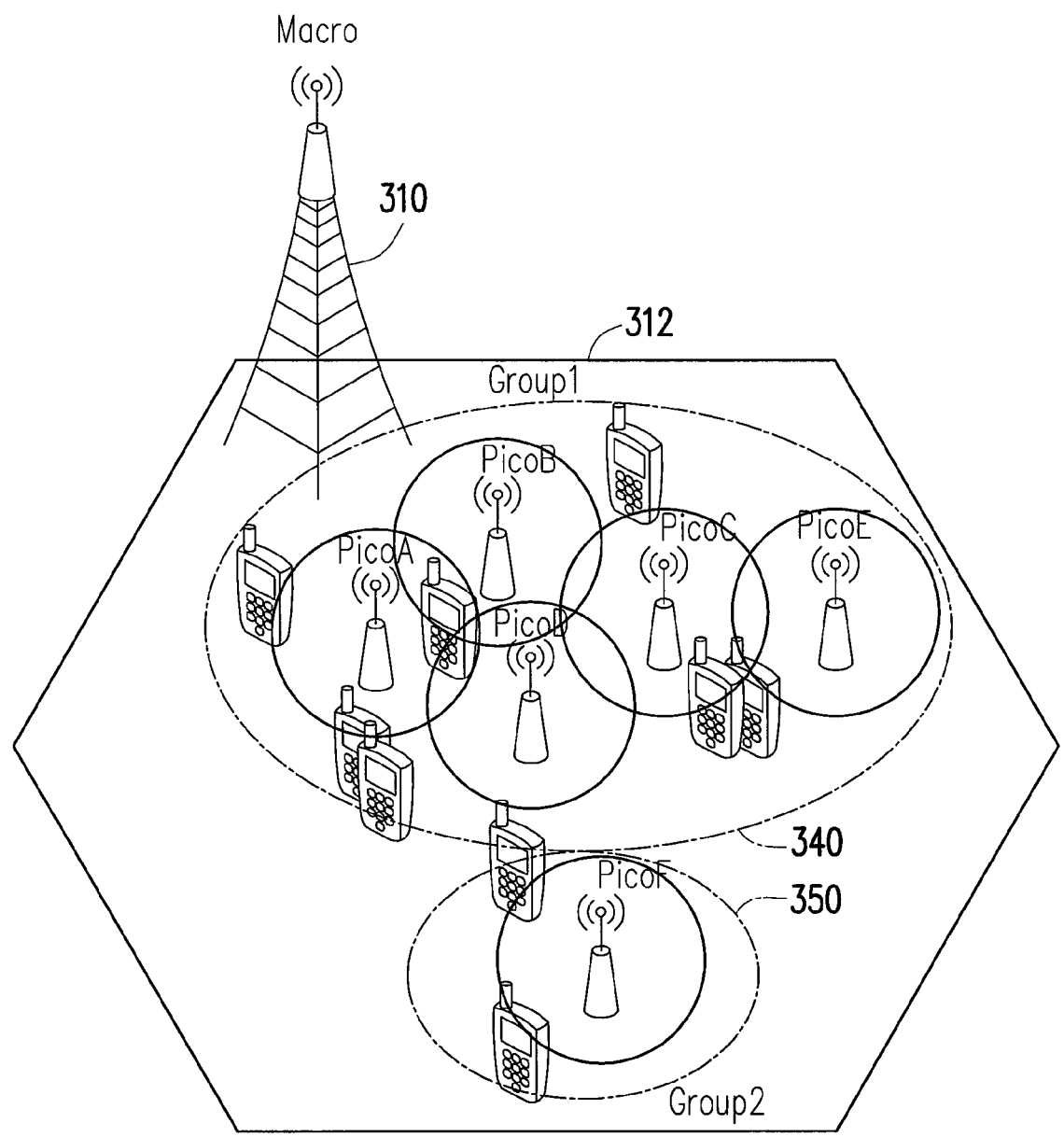

Please refer to FIGS. 3A~3C, which schematically illustrate some exemplary embodiments of the static negotiation interference mitigation method ("SNIM").

FIG. 3A shows a flow chart of one of the embodiments to schematically illustrate the SNIM method. The SNIM method is started in step S310. In step S320, Pico stations are divided into groups according to criteria. In the criteria, at least one factors including pathloss, large-scale fading, or other fading are considered, so the Pico-Pico links between a Pico station and its neighbor Pico stations in a group have strong interference. Alternatively, an operator may be assigned in the small cell wireless network to determine which stations are neighbor, where the criteria could be chosen by the operator itself. Furthermore, some small or common cell stations may not join the negotiation because of functional or other reasons. In step S330, some Pico stations having many neighbor Pico stations are determined in the group.

In step S340, it is determined that any one of the Pico stations having many neighbor Pico stations in the group is active in transmission. If such Pico station is active, as in step S350, that is, the Pico stations having many neighbor Pico stations are active in transmission, all Pico stations in the group choose the same UL-DL configuration according to their collective traffic conditions, or choose their respective UL-DL configurations, which have similar subframe structures. For example, UL-DL configurations 0 and 6 are only different in one DL/UL subframes and these two UL-DL configurations are similar with each other. In step S360, if such Pico station is inactive, that is, the Pico station having many neighbor Pico stations in the group is inactive, the other Pico stations in the group flexibly choose UL-DL configurations according to their respective traffic conditions. In step S370, steps S330, S340, S350 and S360 are repeated every reconfiguration period. Steps S320, S330, S340, S350 and S360 are repeated when the Picocell network topology changes.

If the Pico stations having many neighbor Pico stations in the group are active in transmission but reduce the DL transmission power in some conflictive subframes, the other Pico stations in the group will be able to flexibly choose UL-DL configurations according to their respective traffic conditions.

Please refer to FIG. 3B, there are four Pico stations, including Pico stations PicoA, PicoB, PicoC, and PicoD. There are strong DL-UL interferences between Pico stations PicoA and PicoB and between Pico stations PicoC and PicoB, but there is not strong DL-UL interference between Pico stations PicoA and PicoC. The Pico stations PicoA, PicoB and PicoC are arranged to be in the same group 320 for negotiation interference mitigation. The Pico station PicoD is individually arranged to be another group 330, which is not required to negotiate for interference mitigation.

If Pico station PicoB is inactive or reduces the DL transmission power in same conflictive subframes, Pico stations PicoA and PicoC will flexibly choose UL-DL configurations according to their respective traffic conditions for possibly achieving a better traffic adaption gain. In principle, at the aspect of reducing the DL transmission power in some conflictive subframes, if Pico stations PicoA and PicoC hope to use Configuration 0 but Pico station PicoB hopes to use Configuration 1, Pico station PicoB is able to reduce the DL transmission power in conflictive subframes 4 and 9. The subframes numbers are illustrated in FIG. 1B.

Please refer to FIG. 3C, in a small cell wireless network, a macro station may provide communication coverage for Pico stations. In the communication coverage 312 of a macro station 310, there are six Pico stations PicoA, PicoB, PicoC, PicoD, PicoE and PicoF, for example. In the communication coverage of each of the Pico stations, there are several UEs communicating thereto for service subscription. In the Pico-cell network topology, there are strong DL-UL interferences between these Pico stations PicoA, PicoB, PicoC and PicoD. There are strong DL-UL interferences between Pico stations PicoA, PicoB and PicoD. There are strong DL-UL interferences between Pico stations PicoB, PicoC and PicoD. There are strong DL-UL interferences between Pico stations PicoC, PicoD and PicoE. In addition, there are strong DL-UL interferences between Pico stations PicoC and PicoE. The Pico stations PicoA, PicoB, PicoC, PicoD and PicoE are arranged to be in the same group 340 for negotiation interference mitigation. The Pico station PicoF is individually arranged to be another group 350, which is not required to negotiate for interference mitigation.

If the Pico station having many neighbor Pico stations in the group is inactive, the other Pico stations in the group can also be grouped in several subgroups according to pathloss, large-scale fading, or other fading to choose UL-DL configurations. If PicoC is inactive and others are active, some Pico-Pico links will be broken and two parts or subgroups will be formed. For example, there are Pico-Pico links in the subgroup including Pico stations PicoA, PicoB, and PicoC. The other part will only include the Pico station PicoD. The two parts will flexibly choose UL-DL configurations according to their respective traffic conditions.

In the methods for interference mitigation, there are several embodiments to determine if there is a strong DL-UL interference between each Pico-Pico link and how to choose a suitable DL-UL configuration, hereinafter are two of them, but not limited thereto.

One of exemplary embodiments related to determine if there is a strong DL-UL interference between each Pico-Pico link is based on pathloss-based criteria. In the embodiment, if there is a low pathloss, such as smaller than 100 dB, between a Pico station and its neighbor Pico station, it is defined that there are strong interferences between the Pico station and the neighbor Pico station. Another one of exemplary embodiments related to determine if there is a strong DL-UL interference between each Pico-Pico link is based on fading-based criteria. If there is a low large-scale fading (the sum of the pathloss and the shadowing fading), such as smaller than 70 dB, between a Pico station and its neighbor Pico station, we define there are strong interferences between the Pico station and the neighbor Pico station.

Figure 4A:
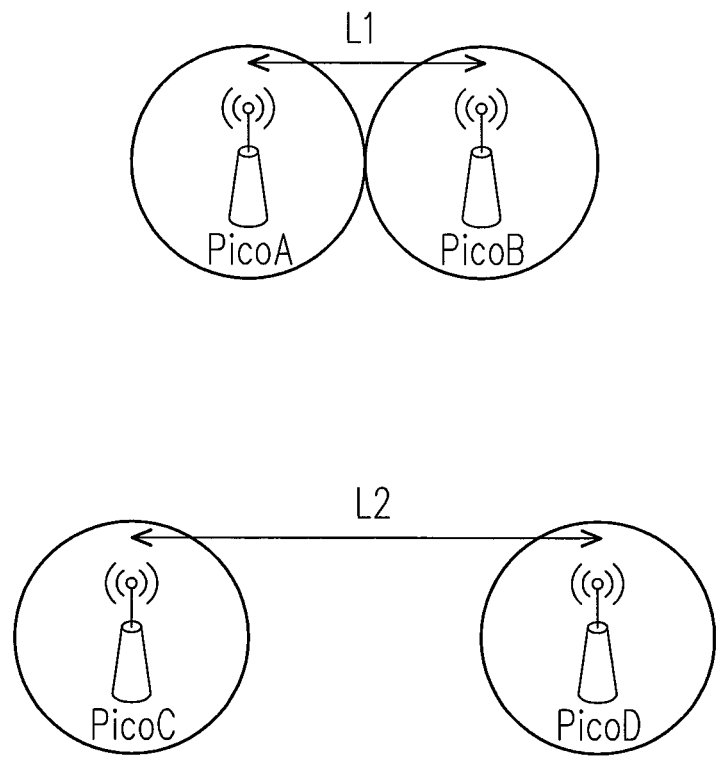
FIG. 4A is a schematic diagram illustrating one embodiment to define there are strong interference between the Pico station and the neighboring Pico Stations.

Please refer to FIG. 4A, which schematically illustrates one embodiment to define there are strong interference between the Pico station and the neighboring Pico Stations. In the method, if the distance between two neighboring Pico stations is "D" and the pathloss between the two neighboring Pico stations is L, the following formula is provided as an embodiment for calculation, $$L = 100.7 + 23.5 \times \log_{10}(D)$$

If it is assumed that the distance between Pico stations PicoA and PicoB is 0.5 km (kilometer, km), the pathloss $L=100.7+23.5\times\log_{10}(0.5\text{ km})=93.63$ dB, which can be regarded as a strong interference. If it is assumed that the distance between Pico stations PicoC and PicoD is 25 km, the pathloss $L=100.7+23.5\times\log_{10}(2\text{ km})=107.8$ dB, which cannot be regarded as a strong interference. The aforesaid formula is one of the exemplary embodiments, and is not limited thereto.

There are some exemplary embodiments related to methods to choose a suitable DL-UL configuration. One of the embodiments, please refer to FIG. 4B, which schematically illustrates one embodiment to choose a suitable DL-UL configuration. In the embodiment, a rate of DL (downlink) and UL (uplink) data currently in the buffers and a rate of DL and UL arrival data may be used for evaluation of choosing suitable DL-UL configuration.

The rate of DL and UL data may be defined as followed:

$$R_{\frac{UL}{DL}} = \frac{\Sigma_{i=0}^{n} QD_{UL}^{i}}{\Sigma_{i=0}^{n} QD_{DL}^{i}},$$

where $QD^i_{UL}$ and $QD^i_{DL}$ are the data currently in the DL buffer and the UL buffer of the cell or station i, and n is the number of the cells in the negotiation.

The rate of DL and UL data may be defined as followed:

$$R_{\frac{UL}{DL}} = \frac{\Sigma_{i=0}^{n} AD_{UL}^{i}}{\Sigma_{i=0}^{n} AD_{DL}^{i}},$$

where $AD^i_{UL}$ and $AD^i_{DL}$ are the arrival data currently in the DL buffer and the UL buffer of the cell or station i, and n is the number of the cells in the negotiation.

Figure 4B:
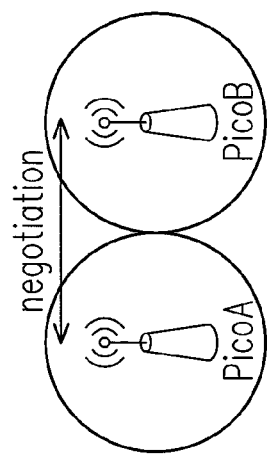
FIG. 4B is a schematic diagram illustrating one embodiment to choose a suitable DL-UL configuration.
Figure 5A:
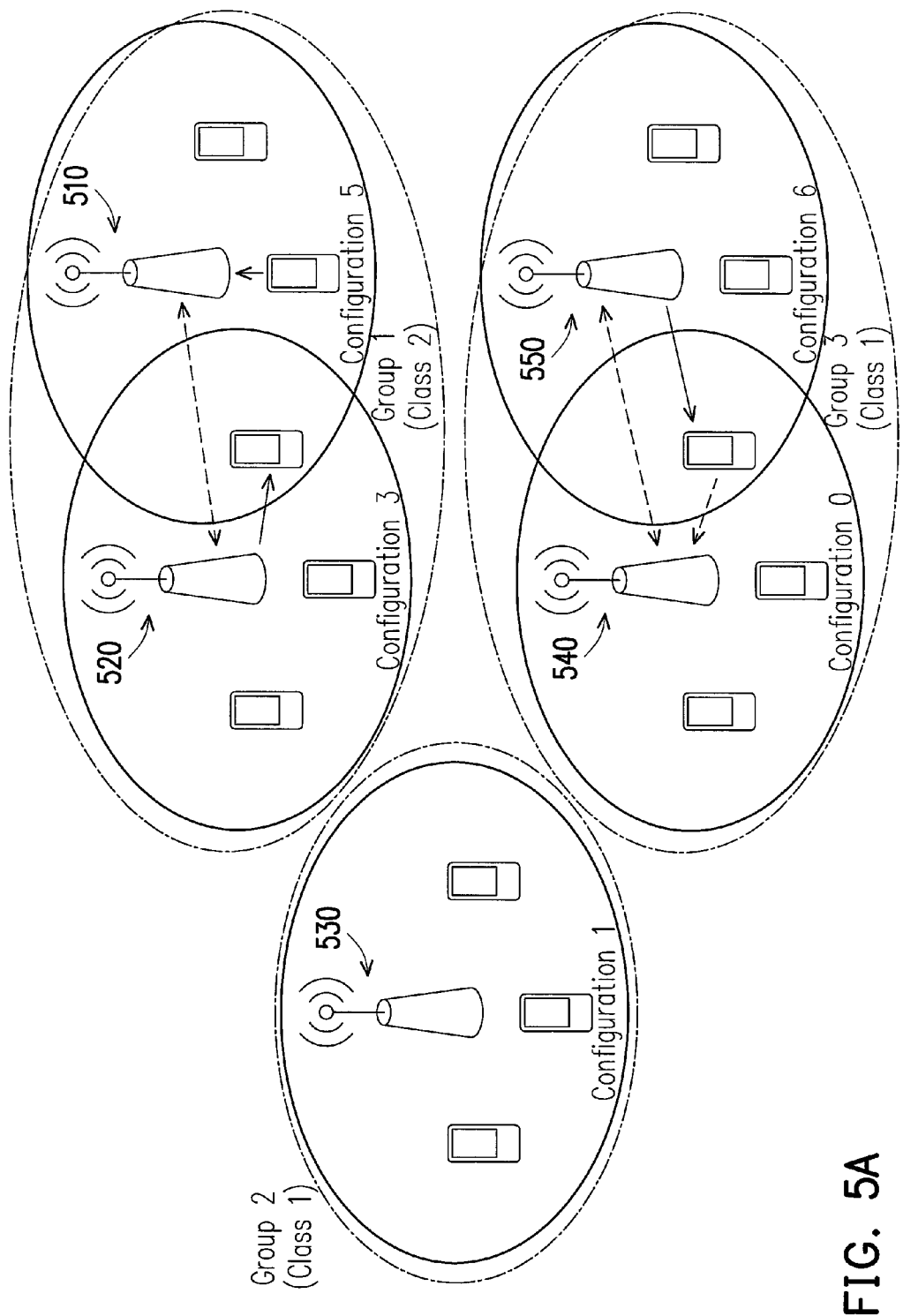
FIGS. 5A~5B are schematic diagrams respectively illustrating an exemplary embodiment of an interference mitigation method for a group structure by using switch-point periodicities.
Figure 5B:
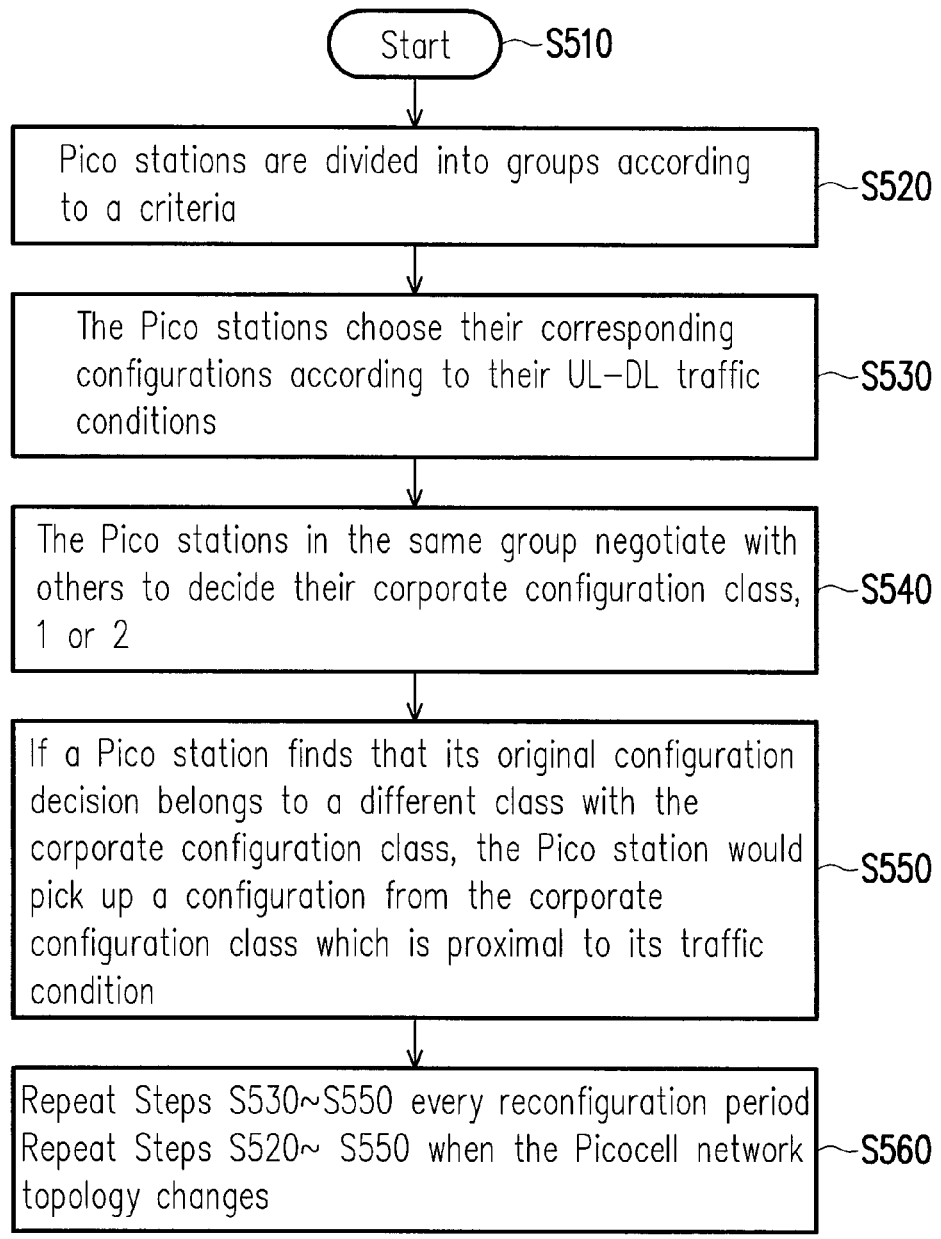
Figure 6A:
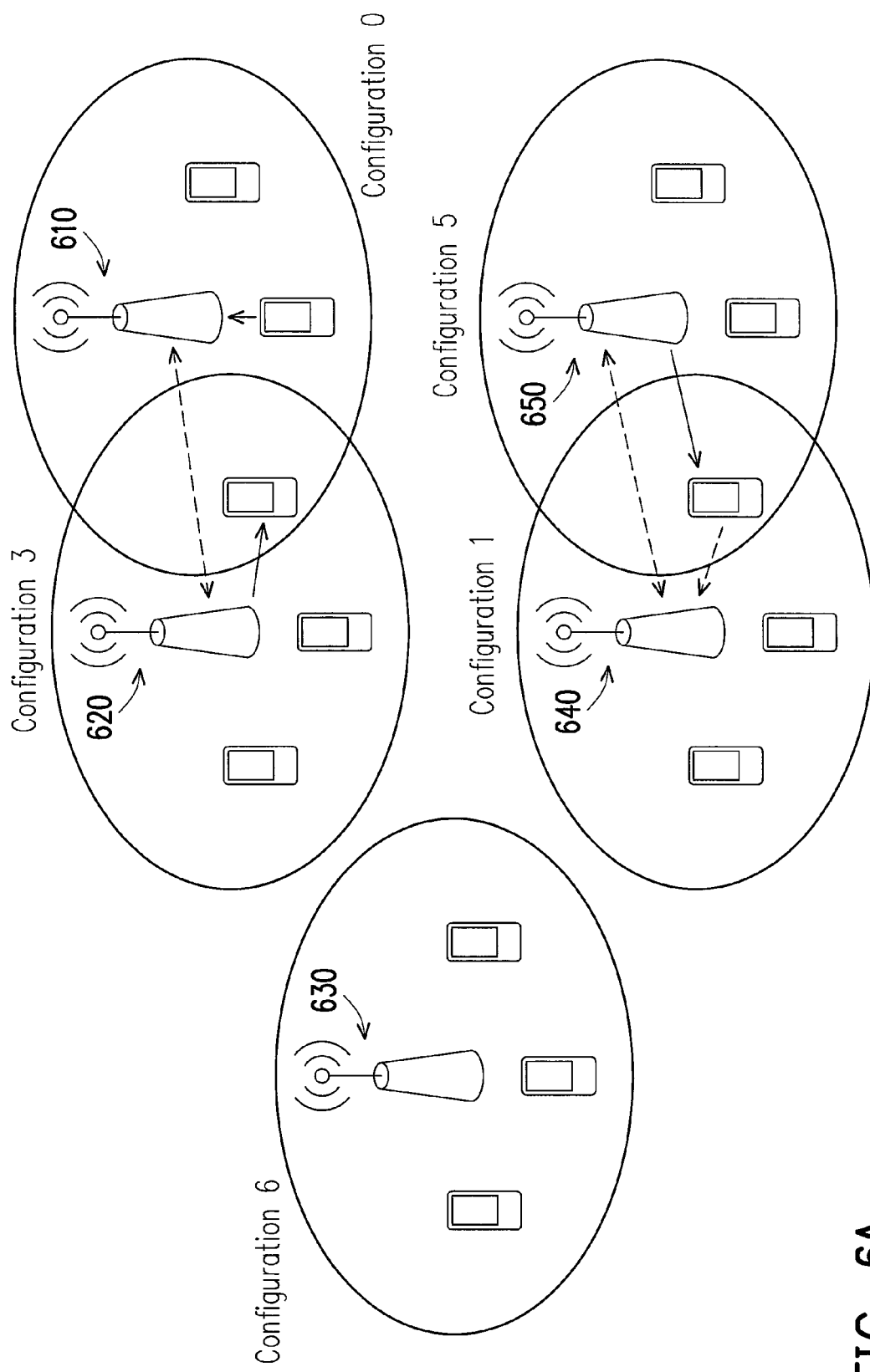
FIGS. 6A~6B are schematic diagrams respectively illustrating an exemplary embodiment of an interference mitigation method for a normal structure by choosing corresponding configurations according to traffic conditions.
Figure 6B:
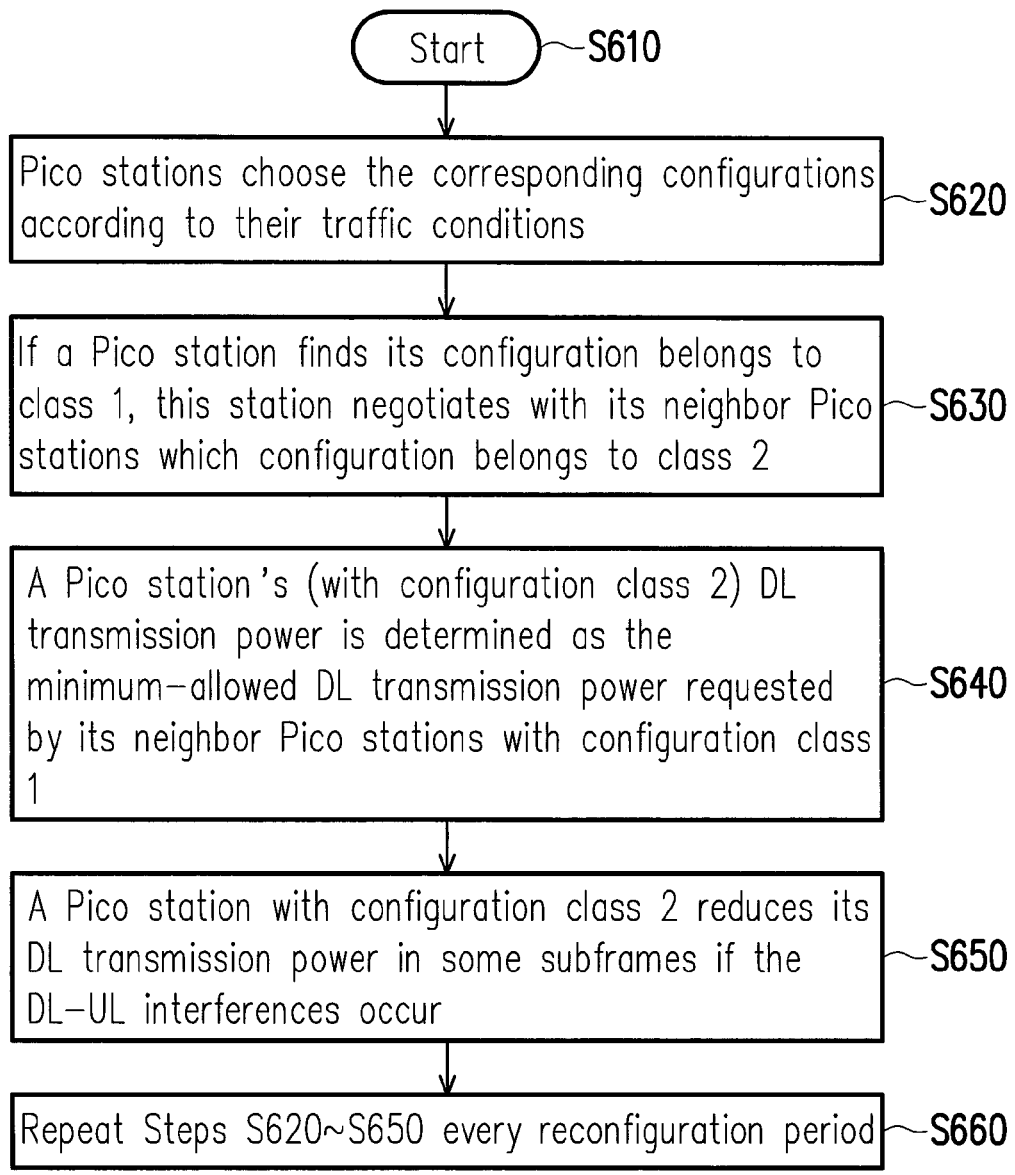

Please refer to FIG. 4B, use Pico stations PicoA and PicoB as an example involved in negotiation. For Pico station PicoA, $QD^1_{UL}=86$, $QD^1_{DL}=106$, for Pico station PicoB, $QD^2_{UL}=123$, $QD^2_{DL}=206$, the $R_{UL/DL}=(86+123)/(106+206)=0.67$. The suitable configuration related to $R_{UL/DL}=0.67$ is UL-DL configuration 1. The methods of mitigating interference in small cell environments for TDD reconfiguration comprise:

In the methods of some exemplary embodiments for interference mitigation in a small cell wireless network, negotiations between different Pico stations are provided for interference mitigation. By such negotiations, UL-DL configurations are chosen in considering interference between neighboring Pico stations and the interferences therefrom are effectively mitigated. In some implementation of the methods, two embodiments are respectively proposed in FIGS. 5A~5B and FIGS. 6A~6B, for example. FIGS. 5A~5B schematically illustrate an exemplary embodiment of an interference mitigation method for a group structure by using switch-point periodicities. In FIGS. 6A~6B, schematically illustrate an exemplary embodiment of an interference mitigation method for a normal structure by choosing corresponding configurations according to traffic conditions.

Taking the LTE TDD for example, in LTE TDD subframe allocation, a total of seven UP-DL (uplink-downlink) configurations have been set, and these use either 5 ms or 10 ms switch-point periodicities. In the case of the 5 ms switch-point periodicity, a special subframe exists in both half frames. In the case of the 10 ms switch-point periodicity, the special subframe exists in the first half frame only.

Please refer to FIG. 5A, there are five Pico stations 510, 520, 530, 540 and 550 in the wireless network. UL-DL configurations respectively corresponding to Pico stations 510, 520, 530, 540 and 550 are Configuration 5, 3, 1, 0 and 6.

According to the switch-point periodicities as defined in LTE TDD for example, the configurations are divided into two classes for example, but not limited thereto. More classes and different bases such as the number of the conflictive subframes between UL-DL configurations may be used for implementation. Configuration class 1 may include UL-DL configuration 0, 1, 2, 6 (switch-point periodicity is 5 ms), and configuration class 2 may include UL-DL configuration 3, 4, 5 (switch-point periodicity is 10 ms). That is, Pico stations 510 and 520 belong to configuration class 2, Pico stations 530, 540 and 550 belong to configuration class 1. In other one of embodiments of the disclosures, the configurations may be divided into three classes for implementation. For example, configuration class 1 may include UL-DL configuration 0, 6 (the conflictive subframes is less than two), configuration class 2 may include UL-DL configuration 1, 2 (the conflictive subframes is less than two), and configuration class 3 may include UL-DL configuration 3, 4, 5 (the conflictive subframes is less than two). The number of classes and different bases such as the number of the conflictive subframes between UL-DL configurations may be used as desired in different applications.

Please refer to FIG. 5B, which shows a flow chart of one of the embodiments to schematically illustrate the interference mitigation method. When the method is started, as in step S510. In step S520, Pico stations are divided into groups according to criteria. In the criteria, at least one factors including pathloss, large-scale fading, or other fading are considered, so the Pico-Pico links between a Pico station and its neighbor Pico stations in a group have strong interference. Alternatively, an operator may be assigned in the small cell wireless network to determine which stations are neighbor, where the criteria could be chosen by the operator itself. Furthermore, some small or common cell stations may not join the negotiation because of functional or other reasons. In step S530, Pico stations choose their corresponding configurations according to their UL-DL traffic conditions. In step S540, Pico stations in the same group negotiate with others to decide their corporate configuration class, for example, class 1 or class 2. In step S550, if a Pico station finds that its original configuration decision belongs to a different class with the corporate configuration class, the Pico station would pick up one of configurations belongs to the corporate configuration class which is proximal to its traffic condition. In step S560, steps S530~S550 are repeated every reconfiguration period, and steps S520~S560 are repeated when the Picocell network topology changes.

As in FIG. 5A, Pico stations 510, 520, 530, 540 and 550 are divided into 3 groups (Group 1, Group 2 and Group 3) and Pico-Pico links of the Pico stations within the same group have low pathloss. Each group decides its corporate configuration class after step S540 is executed. Then a Pico station chooses its configuration from the corporate configuration class according to its traffic condition after S550.

FIGS. 6A~6B, schematically illustrate an exemplary embodiment of an interference mitigation method for a normal structure by choosing corresponding configurations according to traffic conditions. There are five Pico stations 610, 620, 630, 640 and 650 in the wireless network. UL-DL configurations respectively corresponding to Pico stations 610, 620, 630, 640 and 650 are Configuration 0, 3, 6, 1 and 5.

FIG. 6B, which shows a flow chart of one of the embodiments to schematically illustrate the interference mitigation method. When the method is started, as in step S610. In step S620, Pico stations choose the corresponding configurations according to their traffic conditions. In step S630, if a Pico station finds its configuration belongs to class 1, for example, the station negotiates with its neighbor Pico stations which configuration belongs to class 2, to request to reduce the DL transmission power in some subframes, for example, during the second half of one frame if the DL-UL interferences occur. In one embodiment, the subframes during the second half of one frame is Subframes 5~9, as defined in switch-point periodicities of LTE TDD frame structure.

In step S640, a Pico station's (with configuration class 2) DL transmission power is determined as the minimum-allowed DL transmission power requested by its neighbor Pico stations with configuration class 1. The DL transmission causes interference under a predetermined threshold. IN step S650, a Pico station with configuration class 2 reduces its DL transmission power in some subframes during the second half of one frame. In step S660, steps S620~S650 every reconfiguration period.

Pico stations choose the corresponding configurations according to their traffic conditions. The Pico station with configuration class 1 negotiates with the interfering Pico stations with configuration class 2 to figure out the DL transmission power. As shown in FIG. 6A, for example, the Pico station 610 with configuration 0 (class 1) negotiates with the interfering Pico station 620 with configuration 3 (class 2) to figure out the DL transmission power. The Pico station 640 with configuration 1 (class 1) negotiates with the interfering Pico station 650 with configuration 5 (class 2) to figure out the DL transmission power. Consequently, Pico stations with configuration class 2 reduce the DL transmission power in some subframes during the second half of one frame if the DL-UL interferences occur, and that results in an acceptable UL SINR for Pico stations with class 1.

Figure 7:
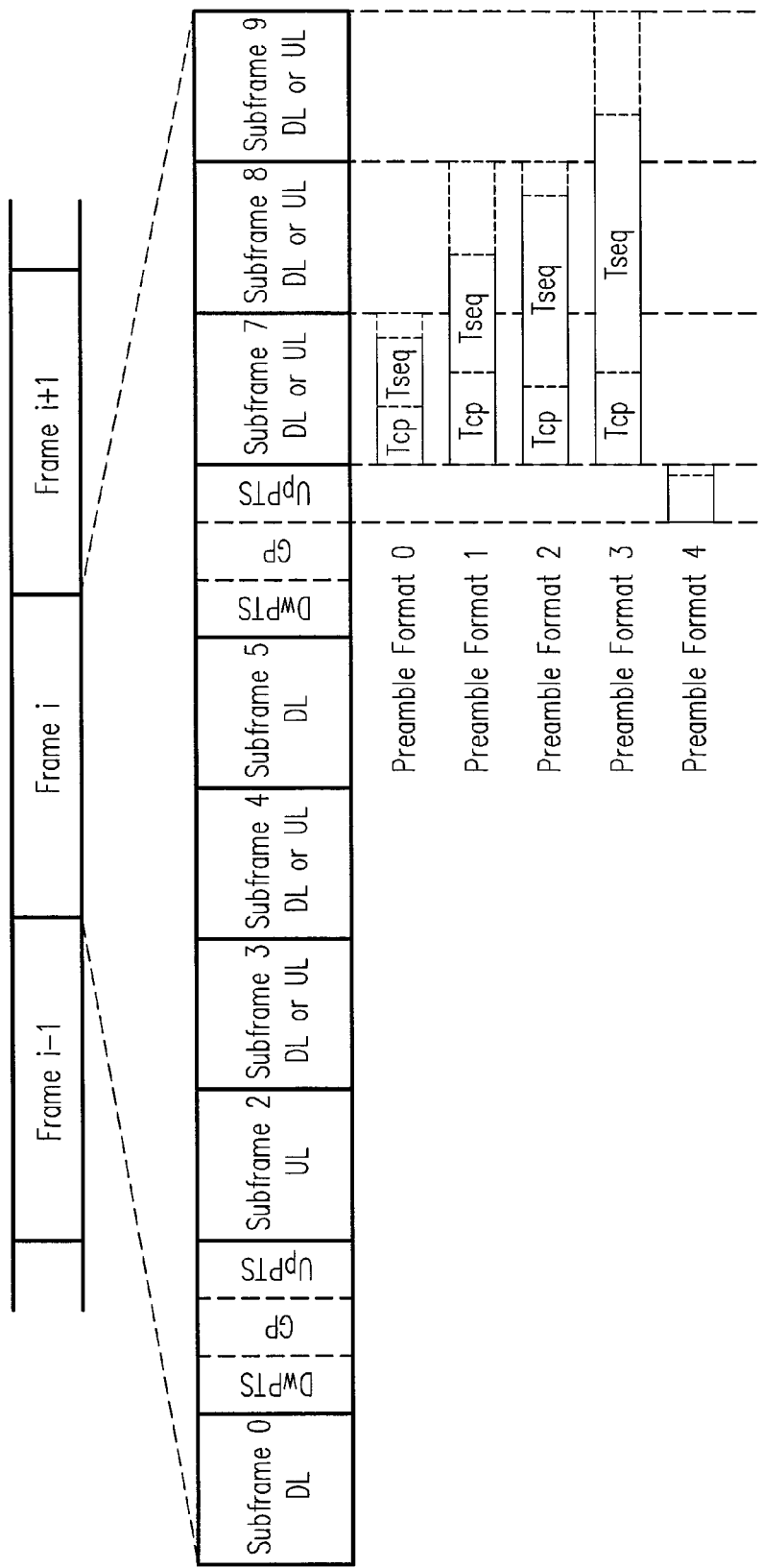
FIG. 7 is a schematic diagram illustrating one embodiment that UL control signals are allocated in the second half of one frame with 5 ms switch-point periodicity.

Please refer to FIG. 7, in one embodiment, UL control signals like PRACH could be allocated in the second half of one frame with 5 ms (for example) switch-point periodicity. A subframe time structure with 5 ms switch-point periodicity of PRACH preamble is illustrated.

In the exemplary embodiments of the interference mitigation method using switch-point periodicities, the configurations are divided into two classes or several classes. The Pico stations in a group can use the configurations in the same class to mitigate DL-UL interferences in the group. The Pico stations which are identified as interfering Pico stations can reduce DL transmission power in some subframes during the second half of one frame to mitigate DL-UL interferences.

In the exemplary embodiments of the dynamic negotiation interference mitigation method, an active Pico station negotiates with the neighbor Pico stations and the neighbors of the neighbor Pico stations that are active in transmission to choose a suitable UL-DL configuration according to their collective traffic conditions. With grouping, if the Pico stations having many neighbor Pico stations in a group are active in transmission, the all Pico stations in the group choose the same UL-DL configuration according to their collective traffic conditions for possibly reducing interferences between the Pico station and the neighbor Pico stations.

With grouping, if the Pico stations having many neighbor Pico stations in a group are inactive, the other Pico stations in the group flexibly choose UL-DL configurations according to their respective traffic conditions for possibly achieving a better traffic adaption gain. The other Pico stations in the group may also be grouped in several subgroups to choose UL-DL configurations.

With grouping and transmission power control, if the Pico stations having many neighbor Pico stations in a group are active in transmission but reduce the DL transmission power in some conflictive subframes, the other Pico stations in the group could still flexibly choose UL-DL configurations according to their respective traffic conditions for possibly achieving a better traffic adaption gain. The other Pico stations in the group may also be grouped in several subgroups to choose UL-DL configurations.

With grouping and subgrouping, the Pico stations with strong DL-UL interferences in the group are linked and get an undirected graph. If several Pico stations are inactive and the undirected graph can be separated into several parts by removing the inactive Pico stations and their edges, the several parts will flexibly choose UL-DL configurations according to their respective traffic conditions.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An interference mitigation method for a plurality of stations in a cellular wireless network, wherein the plurality of stations uses a plurality of uplink-downlink (UL-DL) configurations in transmission, the method comprising:
   determining neighbor stations of a first station from the plurality of stations by criteria; and
   the first station negotiating with at least a portion of neighbor stations to determine UL-DL configurations of the first station and the portion of the neighbor stations when the first station is active in transmission, otherwise, the neighbor stations flexibly determining one of the UL-DL configurations for transmission, wherein the UL-DL configurations of the first station and the portion of the neighbor stations are determined by calculating at least a rate of DL data and UL data of at least one of the first station and the portion of the neighbor stations.

2. The interference mitigation method of claim 1, further comprising:
   the portion of the neighbor stations further negotiating with their first neighbor stations of the portion of the neighbor stations to determine their UL-DL configurations, wherein their first neighbor stations are determined by the criteria.

3. The interference mitigation method of claim 1, wherein the UL-DL configurations of the neighbor stations of the first station are determined with the criteria chosen by an operator or based on pathloss or large-scale fading.

4. The interference mitigation method of claim 1, wherein determining the UL-DL configurations of the first station and the portion of the neighbor stations is further limited by the number of conflictive subframes between UL-DL configurations.

5. The interference mitigation method of claim 1, wherein at the time when every reconfiguration period starts, the first station negotiates with at least a portion of the neighbor stations to determine the UL-DL configurations between the first station and the portion of the neighbor stations for transmission when the first station is active in transmission again.

6. The interference mitigation method of claim 1, wherein when a network topology of the stations in the cellular wireless network changes, the neighbor stations of the first station are determined again, and the first station negotiates with at least a portion of the newly-determined neighbor stations to determine the UL-DL configurations between the first station and the portion of the newly-determined neighbor stations for transmission when the first station is active in transmission again.

7. The interference mitigation method of claim 1, wherein the UL-DL configurations are 3GPP Long Term Evolution (LTE) TDD UL-DL configurations.

8. The interference mitigation method of claim 1, wherein the UL-DL configurations between the first station and the portion of the neighbor stations for transmission is determined by at least one of factors comprising impacts of DL interference on UL SINR (Signal to Interference plus Noise Ratio) and UL interference on DL SINR.

9. The interference mitigation method of claim 1, wherein the cellular wireless network is a small cell network of TDMA, TD-SCDMA, WiMax TDD, LTE TDD configurations.

10. The interference mitigation method of claim 1, further comprising dividing the plurality of stations in the cellular wireless network into a plurality of groups according to switch-point periodicities or conflictive subframes after the neighbor stations of the first station are determined, wherein the first station and the neighbor stations of the first station are in one of the plurality of groups.

11. The interference mitigation method of claim 10, wherein when the first station is active in transmission, the first station and the portion of the neighbor stations choose the same UL-DL configuration for transmission.

12. The interference mitigation method of claim 10, wherein when the first station is active in transmission, the first station and the neighbor stations choose the UL-DL configurations according to the number of conflictive subframes between UL-DL configurations.

13. The interference mitigation method of claim 10, further comprising, when a network topology of the stations in the cellular wireless network changes, dividing the plurality of stations in the cellular wireless network into another plurality of groups again after the plurality of stations negotiating with each other, neighbor stations of the first station are determined again, and the first station negotiates with a portion of the newly-determined neighbor stations to determine the UL-DL configurations between the first station and the portion of the newly-determined neighbor stations for transmission when the first station is active in transmission again.

14. The interference mitigation method of claim 10, further comprising the UL-DL configurations being divided into a plurality of classes according to switch-point periodicities corresponding to UL-DL configurations, wherein the first station and the portion of the neighbor stations in the same group choose UL-DL configurations which belong to the same class for transmission.

15. The interference mitigation method of claim 10, further comprising the UL-DL configurations being divided into a plurality of classes according to conflictive subframes between UL-DL configurations, wherein the first station and the portion of the neighbor stations in the same group choose their respective UL-DL configurations for transmission belongs to the same class.

16. The interference mitigation method of claim 10, wherein the UL-DL configurations are divided into a plurality of classes according to switch-point periodicities corresponding to the UL-DL configurations,
   wherein when the first station is active, the first station finding a part of the neighbor stations that choose the UL-DL configurations that are not the same class with the first station, and the first station requesting the part of the neighbor stations to reduce transmission power.

17. The interference mitigation method of claim 16, wherein the part of the neighbor stations to reduce transmission power in transmitting some subframes of a frame if the interference occurs.

18. The interference mitigation method of claim 16, wherein a plurality of frames are used for transmission between the first station and the neighbor stations, wherein each of the frames includes a plurality of subframes in a first half part and a second half part, wherein the part of the neighbor stations reducing downlink (DL) transmission power in transmitting the subframes during the second half part of the frames if the interference occurs.

19. A station, suitable for a wireless network, the station comprising:

a transceiver configured to transmit and receive wireless signals with a plurality of neighbor stations in the wireless network, wherein the station and the plurality of neighbor stations uses a plurality of uplink-downlink (UL-DL) configurations in transmission, wherein the plurality of neighbor stations corresponding to the station is determined by criteria; and a processor coupled to the transceiver and configured to negotiating with at least a portion of the neighbor stations to determine the UL-DL configurations of the station and the portion of the neighbor stations when the station is active in transmission, otherwise, the neighbor stations flexibly determining one of UL-DL configurations for transmission, wherein the processor is configured to determine the UL-DL configurations of the station and the portion of the neighbor stations by calculating at least a rate of DL data and UL data of at least one of the station and the portion of the neighbor stations.

20. The station of claim 19, wherein the UL-DL configurations of the neighbor stations of the station are determined with the criteria chosen by an operator or based on pathloss or large-scale fading.

21. The station of claim 19, wherein the processor is configured to determine the UL-DL configurations of the station and the portion of the neighbor stations by further considering the number of conflictive subframes between UL-DL configurations.

22. The station of claim 19, wherein the processor is configured to further divide the plurality of stations in the wireless network into a plurality of groups according to switch-point periodicities or conflictive subframes after the neighbor stations of the station are determined, wherein the station and the neighbor stations are in one of the plurality of groups.

23. The station of claim 22, wherein when the station is active in transmission, the station and the portion of the neighbor stations choose the same UL-DL configuration for transmission.

24. The station of claim 22, wherein when the station is active in transmission, the station and the neighbor stations choose the UL-DL configurations according to the number of conflictive subframes between UL-DL configurations.

25. The station of claim 22, wherein the processor is further configured to, when a network topology in the wireless network changes, divide the plurality of stations in the wireless network into another plurality of groups again after the plurality of stations negotiating with each other, neighbor stations of the station are determined again, and the station negotiates with a portion of the newly-determined neighbor stations to determine the UL-DL configurations between the station and the portion of the newly-determined neighbor stations for transmission when the station is active in transmission again.

26. The station of claim 22, wherein the processor is configured to divide the UL-DL configurations into a plurality of classes according to switch-point periodicities corresponding to UL-DL configurations, wherein the station and the portion of the neighbor stations in the same group choose UL-DL configurations which belong to the same class for transmission.

27. The station of claim 22, wherein the processor is configured to divide the UL-DL configurations into a plurality of classes according to conflictive subframes between UL-DL configurations, wherein the station and the portion of the neighbor stations in the same group choose their respective UL-DL configurations which belong to the same class for transmission.

28. The station of claim 22, wherein the processor is configured to divide the UL-DL configurations into a plurality of classes according to switch-point periodicities corresponding to the UL-DL configurations, wherein when the station is active, the processor is configured to find a part of the neighbor stations that choose the UL-DL configurations that are not the same class with the station, and request the part of the neighbor stations to reduce transmission power.

29. The station of claim 28, wherein the UL-DL configurations are 3GPP Long Term Evolution (LTE) TDD UL-DL configurations.

30. The station of claim 28, wherein the part of the neighbor stations to reduce downlink (DL) transmission power in transmitting some subframes of a frame if the interference occurs.

31. The station of claim 28, wherein a plurality of frames are used for transmission between the station and the neighbor stations, wherein each of the frames includes a plurality of subframes in a first half part and a second half part, wherein the part of the neighbor stations reducing transmission power in transmitting the subframes during the second half part of the frame if the interference occurs.

32. A network system comprising a plurality of the stations as claimed in claim 19, wherein the plurality of the stations comprises small cells, or macro cells, or a combination thereof.

* * * * *